3,118,920
3-OXO-18-HYDROXY STEROIDS

Albert Wettstein and Ernst Vischer, Basel, Charles Meystre, Arlesheim, Friedrich Kahnt, Basel, and Robert Neher, Binningen, Switzerland, assignors to Ciba Pharmaceutical Products Inc., Summit, N.J.
No Drawing. Filed June 29, 1955, Ser. No. 518,923
Claims priority, application Switzerland July 9, 1954
9 Claims. (Cl. 260—397.47)

This invention relates to a method for preparing oxygenated steroids. More particularly, this invention is concerned with a method for preparing 18-oxygenated steroids by subjecting a steroid containing a methyl group in the 13-position to the oxidizing action of animal enzymes, isolating the resulting 18-hydroxylated steroid and, if desired, further converting said steroid to functional derivatives.

Hydroxyl groups have indeed been previously introduced into steroids, especially into the 11-, 17- and 21-positions, with the aid of organ enzymes. However, 18-hydroxylated steroids have not hitherto been obtained.

We have now discovered that hydroxylation of the 18-position of steroids can be accomplished by contacting steroids containing a methyl group in the 13-position with enzymes of animal origin. The enzymes we have found to be most suitable for this purpose and which we prefer, are those of the suprarenal glands. They are employed either in the form of total homogenates or as individual fractions. It is particularly advantageous to employ enriched preparations which are present in the supernatant solution obtained by centrifuging the homogenates. If desired, chopped suprarenal glands may be used as well as perfusions through fresh suprarenal glands in vivo or in vitro.

As starting materials in the present process we prefer to employ those steroids containing a methyl group in the 13-position which are oxygenated, advantageously in the 3-position and in one or more of the 11-, 17-, 20-, 21- and also the 6- and 16-positions, and functional derivatives thereof, for example, sterols, bile acids, etianic acids spirostanes, furostanes, pregnanes and androstanes, which contain in the said positions a free or functionally converted oxo or hydroxyl group such, for example, as the esters, ethers, thioethers, thiol- or thion-esters, acetals, mercaptals, ketals, and enol derivatives such as enol esters or enamines, hydrazones, semicarbazones and the like. There are advantageously used saturated or unsaturated compounds of the androstane or pregnane series, which are oxygenated in the 3-position and also in the 17- or 20-position and, if desired, in the 11- and/or 21-position, and functional derivatives thereof. The unsaturated compounds may contain a double bond in the 1-, 4-, 5-, 6-, 7-, 9-, 11-, 14-, 15- and/or 16-positions. The starting materials may also contain additional substituents, such as epoxy groups or halogen atoms, for example, in the 4-, 5-, 6-, 7-, 8-, 9-, 11-, 12-, 14- or 16-positions. The above-mentioned starting materials may be of any desired steric configuration and may also belong to the so-called homo- and/or nor-series, especially the 19-nor-series. The corresponding racemates can also be used, such as are obtainable, for example, by total synthesis. There may be mentioned, for example, the following compounds: $\Delta^4$-3:20-dioxo-21-hydroxy-pregnene, $\Delta^4$-3:20-dioxo-11:21-dihydroxy-pregnenes, $\Delta^4$-3:11:20-trioxo-21-hydroxy-pregnene, $\Delta^4$-3:20-dioxo-17α:21-dihydroxy-pregnene, $\Delta^4$-3:20-dioxo-11:17α:21-trihydroxy-pregnenes, $\Delta^4$-3:11:20-trioxo-17α:21-dihydroxy-pregnene, $\Delta^4$-3:20-dioxo-11β:21-dihydroxy-9α-halogen-pregnenes, $\Delta^4$-3:20-dioxo-pregnene, $\Delta^{1,4}$-3:20-dioxo-pregnadiene, $\Delta^{1,4}$-3:20-dioxo-21-hydroxy-pregnadiene, $\Delta^{1,4}$-3:20-dioxo-11:21-dihydroxy-pregnadienes, $\Delta^{1,4}$-3:20-dioxo-11:17:21-trihydroxy-pregnadienes, $\Delta^4$-3-oxo-17-hydroxy-androstenes, $\Delta^4$-3:17-dioxo-androstene, $\Delta^4$-3:11:17-trioxo-androstene and functional derivatives of these compounds.

In a preferred embodiment of our process, a quantity of bovine suprarenal gland material is defatted, disintegrated and mixed with a volume of ice-cold sucrose solution containing buffer salts. The mixture is homogenized in the cold i.e. 1–8° C. at a pH of from about 7.2 to about 8.0, and the resulting homogenate is admixed with a volume of buffer solution containing salts commonly employed for that purpose, such as potassium chloride, sodium chloride, sodium acid phosphate, etc. If desired, substances such as adenosine sodium triphosphate, diphospho-pyridine nucleotid, or triphospho-pyridine nucleotid may also be incorporated in the reaction mixture. A quantity of the desired starting material—namely, a 13-methyl steroid is then added to the reaction mixture, preferably in the form of a solution in a suitable organic solvent such as a lower alkyl alcohol, chloroform, or toluene. The pH is maintained at from about 6.6 to about 8.2, preferably about 7.4 and oxygen is introduced into the reaction mixture. At the end of the reaction the mixture is mixed with an inert organic solvent such as acetone, methanol, ethanol or dioxane at a temperature from about 0° to 10° C. We prefer acetone for this purpose. The undesirable precipitate is removed by suitable means such as filtration or centrifugation. The organic solvent is evaporated and the remaining salt solution may be defatted with a fat solvent such as petroleum ether, benzene, or toluene. The resulting suspension is then extracted with a solvent in which the reaction product is soluble as for example, ethylene chloride, methylene chloride and ethyl acetate.

Purification of the extract may be accomplished in accordance with any of the methods known to those skilled in the art, as for example, adsorption of a chloroform solution of the crude product on a suitable matrix such as aluminum oxide or silica gel, followed by elutriation with mixtures of suitable solvents such as chloroform and acetone. If desired, the purified product may be subjected to further purification procedures such as paper chromatography on cellulose sheets. This chromatography is preferably carried out with a mixture of chloroform and benzene. The bands corresponding to the 18-oxygenated steroid are then cut out and elutriated with a suitable solvent such as methanol. Further paper chromatography may be accomplished by employing a benzene-methanol water system, elutriation being carried out as mentioned above. Other suitable solvent systems for paper chromatography are: formamide-chloroform; propylene glycol-toluene; formamide-benzene; and petroleum ether-benzene-methanol-water.

Additional purification procedures, which may be employed for extracting the products obtained in accordance with the process of this invention, are counter current distribution methods employing benzene-ethanol-water, or heptane-methanol as solvent systems; or treatment with the well known Girard reagents, such as trimethylammonium- or pyridinium-acetic acid hydrazide.

For the further oxidation of the resulting 18-hydroxy-steroids there are suitable the known chemical, biochemical or electrochemical methods, for example, oxidation by means of the chromic acid-pyridine complex, chromic acid in glacial acetic acid bismuth oxide, copper acetate, permanganates, metal alcoholates or phenolates in the presence of ketones, or periodic acid or lead tetracetate. In this manner it is possible to bring about oxidation, especially in the 18-position and/or in any side chain that is present. In this manner there can be obtained, for example, 18-oxo-steroids, 18-acids, 21-oxo-steroids, etio-acids, 17-ketones or the like. The further oxidation in the 18-position may be carried out with the temporary protection of other oxidizable groups, for example, while other hydroxyl groups are in the acylated form.

In order to oxidise, for example, an 11β:18:21-triol selectively in the 18-position the procedure may be as follows: Acylation with trifluoracetic acid yields the 11β:18:21-tris-trifluoracetate, which can be hydrolyzed to the 11β-trifluoracetoxy-18:21-diol, which is then selectively esterified i.e. with the aid of a lower aliphatic carboxylic acid anhydride or halide in the 21-position. The resulting 11β-trifluoracetoxy-21-acyloxy-18-ol is oxidized, using one of the above mentioned oxidizing agents, i.e. chromic acid whereby the corresponding 18-al or 18-acid is obtained depending on the oxidizing agent used. After the oxidation, the protected hydroxyl groups in the 11- and 21-position are liberated by acidic or alkaline hydrolysis, i.e. with the aid of alkali metal bicarbonates. In this manner it is possible, for example, to convert $\Delta^4$-3:20 - dioxo - 11β:18:21 - trihydroxy-pregnene into $\Delta^4$-3:18:20-trioxo - 11β:21 - dihydroxy-pregnene or its 18:11-cyclo-semi-acetal.

The 18-hydroxy-steriods obtainable by the process may be converted by known methods into their functional derivatives, such as their oxygen, sulfur or nitrogen derivatives, for example, ester, ethers, enol-esters, enol-ethers, ketals, thioethers or thioketals, and also hydrazones, oximes or enamines. In these compounds the hydroxyl and/or oxo groups may be completely or partially functionally converted.

In the esters or enol-esters the acid radicals may be those of any desired organic or inorganic acids, such as aliphatic, alicyclic, araliphatic, aromatic or heterocyclic carboxylic, thion-carboxylic, thiol-carboxylic or sulfonic acids, advantageously formic acid, acetic acid, chloracetic acids, trifluoracetic acid, propionic acid, butyric acids, valeric acids, trimethyl acetic acid, diethyl-acetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acids, alkoxy-carboxylic acids, β-cyclopentyl-propionic acid, hexahydrobenzoic acid, benzoic acid, phenyl-acetic acid, cyclohexyl-acetic acid, phenyl-propionic acids, trimethyl-gallic acid, phthalic acid, furane-2-carboxylic acid, isonicotinic acid, methane sulfonic acid, toluene sulfonic acid, sulfuric acids, hydrohalic acids or phosphoric acids.

If desired functionally converted hydroxyl or oxo groups may be converted into the free groups in the compounds obtained. In this manner more especially the functionally converted groups in polysubstituted derivatives may be partially set free. This may be carried out, for example, by chemical or enzymatic hydrolysis, for example, with the aid of an acid or basic agent, or by re-esterification or reacetalization. From the only partially converted, such as esterified or etherified, derivatives obtained in this manner or obtained directly, polysubstituted derivatives, especially mixed esters or ethers or ester-ethers, can be obtained by subsqent functional conversion, for example, by esterification or etherification.

It is known that aldosterone is a steroid having oxygen in 18-position. The new 18-hydroxy-steriods corresponding to the starting materials mentioned above, i.e. steriods containing as the elements C, H and O, are therefore of great value. Of special interest are the 18-hydroxy-pregnanes, i.e. 18-hydroxy-cortexone, and the esters thereof.

The following examples illustrate the invention:

*Example 1*

333 grams of suprarenal gland material from cows are freed from adherent fat immediately after slaughtering and, after being disintegrated, mixed with 340 cc. of an ice-cold saccharose solution, which containes, per liter, 68.4 grams of saccharose, 3.62 grams of sodium chloride, 3.56 grams of secondary sodium phosphate, 1.86 grams of potassium chloride, 1.16 grams of fumaric acid, 3 grams of nicotinic acid amide. The mixture is homogenized for 12 minutes in the cold, during which the pH value is maintained at 7.6 to 7.8 by the addition of caustic soda solution. The homogenate, which amounts to 550 cc., is mixed with the same volume of a salt solution having a pH value of 7.5, which contains, per liter, 3.62 grams of sodium chloride, 3.56 grams of secondary sodium phosphate, 1.86 grams of potassium chloride and 4.64. grams of fumaric acid. To the reaction mixture there are also added 100 cc. of a magnesium sulfate solution of 1 percent strength, 505 milligrams of adenosine sodium triphosphate, 101 milligrams of diphospho-pyridine nucleotid (cozymase) and 10.6 of triphospho-pyridine nucleotid. Into the liquid there are introduced dropwise, while stirring, 3.3 cc. of a cortexone solution of 10 percent strength in ethyl alcohol and the pH value is adjusted to 7.4. Oxygen is introduced into the reaction solution at the rate of 2 liters per minute at 35° C. for 3 hours, during which the pH value is kept constant. The reaction solution is then stirred into 8 liters of freshly distilled acetone, the mixture is allowed to stand in the cold, preferably from 1° C. to 4° C., while stirring gently, and the precipitate formed is separated from the solution by filtering with suction. The residue is washed three times on each occasion with 1 liter of acetone at 40° C., the acetone solutions are united, and then evaporated under reduced pressure at 35–40° C. under nitrogen to a volume of 250 cc. The aqueous fat suspension is then defatted by extraction four times on each occasion with 0.3 parts by volume of petroleum ether boiling at 50–70° C., and is then extracted four times with 0.5 part by volume of freshly distilled ethylene chloride.

The ethylene chloride extract containing the corticosteroids (the extract amounting to about 250 milligrams) is dissolved for the purpose of purification in a small amount of chloroform and adsorbed onto 5 grams of silica gel in chloroform. The column is washed first with 80 cc. of a mixture of chloroform and acetone (99:1) and the corticosteroids are then elutriated with 100 cc. of a mixture of chloroform and acetone (1:1). The elutriate (135 milligrams) is then subjected to preparative paper chromatography for further separation. It is applied to the starting line of seven 20 cm. wide cellulose sheets (Whatman No. 1), which have been previously impregnated with formamide, and chromatography is carried out with a mixture of chloroform and benzene (1:1) until the solvent has reached the paper front. The dried chromatograms are then photocopied in ultraviolet light, the bands corresponding to 18-hydroxy-cortexone (between corticosterone and cortisone) are cut out and elutriated with methanol of 20 percent strength. The elutriate is concentrated in vacuo to one half its volume and extracted five times with the same volume of chloroform. After drying the chloroform solution over sodium sulfate, the chloroform is distilled off in vacuo. The residue is dried in vacuo.

This is followed by a preparative paper chromatography in a benzene-methanol-water 10:5:5 system. The dried chromatogram is photo-copied in ultra-violet light. The band corresponding to 18-hydroxy-cortexone is cut out ($R_f$-value somewhat smaller than that of corticosterone), and elutriation is carried out with absolute methanol. After evaporating the solvent, an amorphous residue remains behind which soon begins to crystallise. The crystals are washed with ether and recrystallized from a mixture of ether and acetone 3:1. In this manner 18-hydroxy-cortexone is obtained in the form of colorless needles melting at 194–204° C. In various other paper chromatographic systems, for example, formamide-chloroform, propylene glycol-toluene, formamide-benzene or petroleum ether-benzene-methanol-water the 18-hydroxy-cortexone moves between $\Delta^4$-17α:21-dihydroxy-pregnene-3:20 - dione and $\Delta^4$ - 11α:21 - dihydroxy - pregnene-3:20- dione. It possesses reducing properties towards silver diamine or blue tetrazolium salts, it shows a yellow fluorescence after treatment with caustic soda solution and only a very weak blue-violet fluorescence after treatment with phosphoric acid of 15 percent strength. In ultraviolet light it exhibits a strong band: λ maximum equals 239 mμ. Analysis indicates the empirical formula $C_{21}H_{30}O_4$. In the infra-red absorption spectrum (taken with a Perkin-Elmer double beam instrument, model 21, in methylene chloride solution at a layer thickness of 0.2 mm. and compensated with methylene chloride of the same thickness) there are characteristic bands, inter alia, at 2.76μ, 2.80–2.85μ (hydroxyl groups), 5.83μ (medium strength), 5.94μ (strong), 6.17μ (medium strength) in the double bond region and at 6.90μ, 7.08μ, 7.21μ, 7.38μ, 7.52μ, 8.15μ, 8.43μ, 9.32μ, 9.44μ and 9.84μ in the fingerprint region.

18-hydroxycortexone can be esterified with any desired organic or inorganic acids, such as aliphatic, alicyclic, araliphatic, aromatic or heterocyclic carboxylic acids, thiocarboxylic acids, thiol-carboxylic acids or sulfonic acids. There may be mentioned more especially acetic acid, propionic acid, trimethyl-acetic acid, oenanthic acid, undecylenic acid, β-cyclopentyl-propionic acid, phenyl-propionic acid and furane-2-carboxylic acid. By reacting 18-hydroxy-cortexone in pyridine with an excess of acetic anhydride there is obtained a diacetate, which in the system formamide/cyclohexane-benzene 2:1 (40° C.) migrates between cortexone acetate and 11-dehydrocorticosterone acetate, and it exhibits reducing properties and also a yellow fluorescence with caustic soda solution and exhibits an ultraviolet absorption at λ max. equals 240 mμ. In the infra-red spectrum no free hydroxyl bands can be detected.

The $\Delta^4$-3:20-dioxo-18:21-diacetoxy-pregnene obtained in this manner can be converted by hydrolysis into the free hydroxy-cortexone. The partial saponification of the diacetate to $\Delta^4$-3:20-dioxo-18-acetoxy-21-hydroxy-pregnene may be carried out, for example, by means of potassium bicarbonate in an aqueous methanolic medium under mild conditions, and also by enzymatic methods.

By reacting the 18-hydroxy-cortexone with somewhat more than the calculated quantity of acetic anhydride there is formed the 21-monoacetate. It can be converted by means of propionic anhydride into the 18-propionate-21-acetate.

In an analogous manner there can be obtained 18:21-diesters with the same or different acyl residues of the acids hereinbefore mentioned, and also 18- or 21-monoesters.

*Example 2*

303 grams of suprarenal gland material from cows are homogenized as described in Example 1. The ice-cold homogenate (510 cc.) is centrifuged in a refrigerated centrifuge for 70 minutes at 6000 revolutions per minute (5000×g). The supernatant solution (330 cc.) has a pH value of 7.4 and is kept in the cold in a closed vessel. The residue from the centrifuge is homogenized again for one minute with 270 cc. of the saccharose solution described in Example 1, and centrifuged for one hour at 6000 revolutions per minute. The supernatant solution from the washing is united with that of the original homogenate (a total of 550 cc., pH value 7.41), and the mixture is centrifuged for 50 minutes in the cold at about 20,000 revolutions per minute (about 20,000×g). The supernatant solution is used as an enzyme solution for the 18-hydroxylation of cortexone. The ice-cold solution is diluted with an equal volume (500 cc.) of the diluting solution described in Example 1, and mixed in a reaction vessel with 410 mg. of sodium adenosine triphosphate, 90 mg. of diphospho-pyridine nucleotid (cozymase) and 9 mg. of triphospho-pyridine nucleotid. The reaction solution is adjusted to a pH value of 7.2 and a temperature of 35° C., and 1.5 cc. of a solution of 10 percent strength of cortexone in ethyl alcohol are added. In the manner more fully described in Example 1, incubation is carried out with the introduction of oxygen for 3 hours at pH value of 7.1–7.25. The working up and isolation of 18-hydroxy-cortexone are carried out exactly as described in Example 1.

*Example 3*

By the oxidation of 10 mg. of 18-hydroxy-cortexone with 20 mg. of periodic acid ($HIO_4.2H_2O$) in 10 cc. of aqueous methanol of 50 percent strength at 20° C. for a few hours there are obtained 8 mg. of a neutral product, the 20→18-lactone of $\Delta^4$-3-keto-18-hydroxy-etiocholenic acid, which crystallizes easily and can be recrystallized from ether. It melts at 214–216° C. with strong sublimation. It can easily be sublimed without decomposition at 140–170° C. under 0.1 mm. pressure of mercury. The lactone migrates in the system formamide/benzene-cyclo hexane 1:1 only a trace further than $\Delta^4$-3:11:17-triketo-androstene (adrenosterone), has no reducing properties and, after treatment with caustic soda solution, exhibits a yellow fluorescence. Its fluorescence reaction with phosphoric acid is negative. Ultraviolet absorption: λ max.=239 mμ; infra-red absorption in methylene chloride exhibits characteristic bands, inter alia, at 5.65μ (strong), 5.96μ (strong), 6.17μ (medium strength) in the double bond region and 6.90μ, 7.28μ, 7.52μ, 8.17μ, 8.43μ, 8.48μ, 8.68μ, 8.77μ, 9.15μ, 9.70μ, 9.79μ, 10.48μ and 10.85μ in the fingerprint region.

What is claimed is:

1. A member selected from the group consisting of an A-ring unsaturated-11-unsubstituted 3-oxo-18-hydroxy-pregnane and an A-ring unsaturated-11-unsubstituted 3-oxo-18-hydroxy-etianic acid, and aliphatic carboxylic acid esters thereof said A-ring unsaturation being selected from the group consisting of $\Delta^1$, $\Delta^4$ and $\Delta^{1,4}$ unsaturation.
2. $\Delta^4$-3,20-dioxo-18,21-dihydroxy-pregnene.
3. A lower aliphatic carboxylic acid ester of the compound of claim 2.
4. A lower aliphatic carboxylic acid 21-ester of the compound of claim 2.
5. A lower aliphatic carboxylic acid 18,21-diester of the compound of claim 2.
6. A lower aliphatic carboxylic acid 18-ester of the compound of claim 2.
7. The $\Delta^4$-3,20-dioxo-18:21-diacetoxy-pregnene.
8. The $\Delta^4$-3,20-dioxo-18-acetoxy-21-hydroxy-pregnene.
9. The $\Delta^4$-3,20-dioxo-18-hydroxy-21-acetoxy-pregnene.

References Cited in the file of this patent

UNITED STATES PATENTS

| | | |
|---|---|---|
| 2,438,715 | Miller | Mar. 30, 1948 |
| 2,440,874 | Reichstein | May 4, 1948 |
| 2,649,401 | Haines | Aug. 18, 1953 |
| 2,649,402 | Murray | Aug. 18, 1953 |
| 2,840,573 | McNiven | June 24, 1958 |
| 2,847,412 | Harman et al. | Aug. 12, 1958 |
| 2,847,425 | Brink et al. | Aug. 12, 1958 |
| 2,862,851 | Reichstein et al. | Dec. 2, 1958 |
| 2,862,925 | Reichstein et al. | Dec. 2, 1958 |
| 2,883,378 | Wettstein et al. | Apr. 21, 1959 |

UNITED STATES PATENT OFFICE
CERTIFICATE OF CORRECTION

Patent No. 3,118,920                                       January 21, 1964

Albert Wettstein et al.

It is hereby certified that error appears in the above numbered patent requiring correction and that the said Letters Patent should read as corrected below.

In the grant, lines 3 and 4, for "assignors to Ciba Pharmaceutical Products Inc., of Summit, New Jersey," read -- assignors to Ciba Corporation, a corporation of Delaware, --; line 13, for "Ciba Pharmaceutical Products Inc., its successors" read -- Ciba Corporation, its successors --; in the heading to the printed specification, lines 5 and 6, for "assignors to Ciba Pharmaceutical Products Inc., Summit, N. J." read -- assignors to Ciba Corporation, a corporation of Delaware --.

Signed and sealed this 23rd day of June 1964.

(SEAL)
Attest:

ERNEST W. SWIDER
Attesting Officer

EDWARD J. BRENNER
Commissioner of Patents